US007798300B2

(12) United States Patent
Combes et al.

(10) Patent No.: US 7,798,300 B2
(45) Date of Patent: Sep. 21, 2010

(54) TRANSMISSION MODULE FOR AN ENGINE-TRANSMISSION UNIT, ESPECIALLY FOR MOTOR VEHICLES

(75) Inventors: Emmanuel Combes, Saint-Cyr-sous-Dourdan (FR); Jerome Victor, Sartrouville (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 623 days.

(21) Appl. No.: 11/570,027

(22) PCT Filed: Jun. 1, 2005

(86) PCT No.: PCT/FR2005/050401

§ 371 (c)(1), (2), (4) Date: Feb. 6, 2007

(87) PCT Pub. No.: WO2005/124175

PCT Pub. Date: Dec. 29, 2005

(65) Prior Publication Data

US 2008/0264749 A1 Oct. 30, 2008

(30) Foreign Application Priority Data

Jun. 3, 2004 (FR) .................................. 04 06027

(51) Int. Cl.
*F16D 25/0638* (2006.01)
*F16D 25/12* (2006.01)
*F16D 13/74* (2006.01)

(52) U.S. Cl. ............. 192/70.12; 192/85.37; 192/85.61; 192/113.34; 192/113.5

(58) Field of Classification Search ............... 192/113.5
See application file for complete search history.

(56) References Cited

U.S. PATENT DOCUMENTS 3,016,121 A * 1/1962 Mosbacher ............... 192/91 A
3,145,816 A * 8/1964 De Lorean et al. ........ 192/91 A (Continued)

FOREIGN PATENT DOCUMENTS

DE 101 51 632 A1 * 5/2003

OTHER PUBLICATIONS

International Search Report mailed Dec. 13, 2005 in PCT/FR2005/050401.

*Primary Examiner*—Rodney H Bonck
(74) *Attorney, Agent, or Firm*—Nicholas E. Seckel

(57) ABSTRACT

The invention relates to a transmission module (10) for an engine-transmission unit, said module comprising an input shaft (11) for connecting to a heat engine, an output shaft (12) for connecting to a gearbox, and a clutch (30) connecting said two shafts. The inventive module also comprises: an independent casing (16) comprising a first half-shell (17) and a second half-shell (18), said two half-shells forming a sealed receiving element (22) containing the clutch (30) which is naturally in the engaged position; a mechanical element (35) for maintaining the clutch (30) in said engaged position by means of a piston in the form of a disk; a hydraulic control circuit (40, 41) for acting directly on the piston against the mechanical element, in the disengaged position of said clutch (30); and a hydraulic circuit (50, 52, 53, 55, 56) for lubricating and cooling the clutch. The invention can be applied to an engine-transmission unit for motor vehicles.

8 Claims, 1 Drawing Sheet

U.S. PATENT DOCUMENTS 3,330,391 A 7/1967 Mamo
5,687,821 A * 11/1997 Lorriette .................. 192/91 A
6,557,687 B1 5/2003 Herchick
2004/0245062 A1 12/2004 Sachs

* cited by examiner

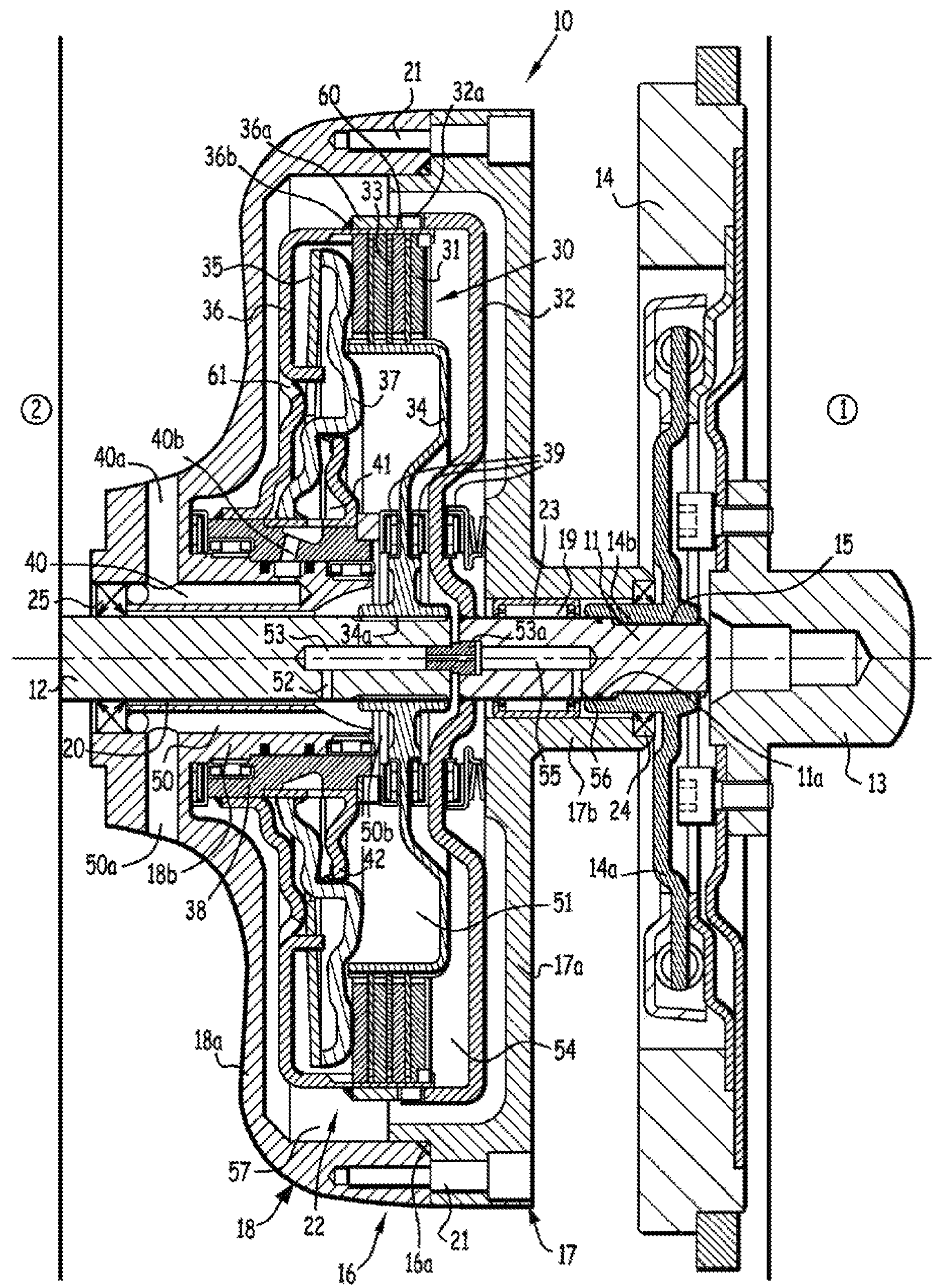
10
21
32a
60
36a
36b
33
31
30
14
35
32
36
37
61
34
②
①
40b
40a
41
39
23
19
11
14b
15
40
25
53
34a
53a
12
52
20
50
55
56
17b
24
11a
13
50a
18b
50b
42
14a
38
51
17a
18a
54
57
18
22
21
16a
16
17

TRANSMISSION MODULE FOR AN ENGINE-TRANSMISSION UNIT, ESPECIALLY FOR MOTOR VEHICLES

The present invention concerns a transmission module for an engine-transmission unit, in particular for a motor vehicle.

The invention concerns also an engine-transmission unit equipped with such a transmission module.

Traditionally, the transmission modules comprise a movement input shaft connected to the crankshaft of an engine-transmission unit, a movement output shaft connected to a gear box, and a connecting clutch between the two shafts.

The clutch fulfills the functions of coupling, uncoupling, managing sliding, and limiting the transmitted torque.

Clutches of the "dry" type are known, which are composed, on the one hand, of a plate equipped at its periphery with a friction lining and integral with the input shaft and, on the other hand, of jaws having a fixed portion integral with the output shaft and a movable portion controlled axially by the clutch pedal. The clamping of the plate between the two portions of the jaws ensures the transmission of the torque by friction.

This type of clutch often used on motor vehicles has a drawback in that it has a bulky size and a heavy weight.

Clutches of the "wet" type are also known, which are composed of several discs movables in axial translation and alternatively smooth and covered by a friction lining, the friction between these discs ensuring the transmission of the torque between the input shaft and the output shaft. The functions of coupling, uncoupling, managing sliding, and limiting the transmitted torque are performed in a lubricated medium, either in a bath or in a mist of oil, or by dipping in oil.

The control is performed by applying an axial pressure on the discs via a plate that is movable in rotation and in translation. In the transmissions of motor vehicles and differentials, the axial movement of this plate cannot generally be performed directly by mechanical means from the outside of the module, because of the size and the number of rotating parts through which it is necessary to pass.

For this reason, the control of the movement of the plate is performed by means of a pressurized fluid. However, the circuit of fluid from the external actuator to the plate is most often complex and it must pass through rotating parts provided with orifices. Sometimes, a rotating piston distinct from the plate provides the force on the latter via a spacer which is itself rotating. These clutches are most often naturally "open" clutches, i.e., they are naturally in unclutched position.

Thus, with this type of clutch, the energy consumption used for controlling the clutch is much higher if, over the life of a motor vehicle, the proportion of the time in the engaged position of this clutch is much higher than the proportion of the time in the unclutched position of said clutch.

An objective of the invention is to propose a transmission module for an engine-transmission unit which avoids the drawbacks mentioned above.

Thus, an object of the invention is a transmission module for an engine-transmission unit, in particular for motor vehicles, of the type comprising a movement input shaft intended to be connected to a thermal engine, a movement output shaft intended to be connected to a gear box, and a connecting clutch between the two shafts, characterized in that it comprises an autonomous casing comprising a first half-shell supporting the input shaft movable in rotation and a second half-shell supporting the output shaft movable in rotation and coaxial to said input shaft, and in that the two half-shells form a sealed housing containing the clutch in a naturally engaged position, a mechanical member for maintaining the clutch in engaged position, via a piston in the shape of a disc, a hydraulic control circuit for controlling this clutch in unclutched position by acting directly on said piston against said mechanical member, and a hydraulic circuit for lubrication and cooling of said clutch.

According to other characteristics of the invention:

- the first half-shell comprises a central barrel equipped with an axial bore for passage of the input shaft,
- the second half-shell comprises a central barrel equipped with an axial bore for passage of the output shaft,
- the clutch comprises a first series of discs carried by a plate integral with the input shaft and a second series of discs disposed between the discs of the first series and carried by a plate integral with the output shaft, said discs being movable in axial translation and returned toward each other under the action of the mechanical member for maintaining the clutch in engaged position,
- the mechanical member for maintaining the clutch in engaged position comprises at least one elastic element interposed between a part fixed in translation carried by a sleeve concentric with the barrel of the second half-shell and the piston mounted slidable on said sleeve and acting on said first series of discs,
- the hydraulic control circuit comprises a longitudinal channel provided in the barrel of the second half-shell and comprising an input connected to a supply of pressurized fluid and an output opening into a chamber formed by the piston and a disc fixed in translation carried by the sleeve on the other side of said piston with respect to said part, said pressurized fluid applying a force on the piston against the force applied by the elastic element,
- said elastic element being formed, for example, by at least one helical spring or at least one elastic washer or a diaphragm.
- the hydraulic lubrication and cooling circuit comprises a longitudinal channel provided in the barrel of the second half-shell and comprising an input connected to a supply of pressurized fluid and an output opening into a space formed between the piston and the plate integral with the output shaft,
- the longitudinal channel is connected, by a through bore, to an axial passage provided in the shaft and communicating, on the one hand, with a space formed between the two plates, and on the other hand, with an axial passage provided in the input shaft and communicating, by a transversal bore, with a space formed between the two half-shells, the part fixed in translation and the plate integral with said input shaft.

Another object of the invention is an engine-transmission unit, in particular for motor vehicles, characterized in that it comprises a transmission module as described above.

The invention will be better understood by reading the following description, given as an example and by reference to the single annexed drawing which is a schematic view in axial cross-section of a transmission module for an engine-transmission unit, in particular for motor vehicles.

The Figure shows a transmission module designated globally by the reference numeral 10 and which comprises a movement input shaft 11 intended to be connected to a thermal engine 1, a movement output shaft 12 intended to be connected to a gear box 2, and a connecting clutch between the two shafts 11 and 12 and designated by the general reference numeral 30.

In a traditional manner, the input shaft 11 is integral in rotation with the crankshaft of the thermal engine 1, of which a portion, or "nose," is shown on FIG. 1 under the reference numeral 13. The crankshaft 13 is equipped with a flywheel 14, and connected to the input shaft 11 via a damping device 14*a* integral in rotation with said input shaft 11 by flutes 15.

The transmission module 10 comprises an autonomous casing 16 comprising a first half-shell 17 supporting the input shaft 11 movable in rotation and a second half-shell 18 supporting the output shaft 12 movable in rotation.

The shafts 11 and 12 are coaxial. The first half-shell 17 is formed by a flange 17*a* equipped with a central barrel 17*b* comprising an axial bore 19 for passage of the input shaft 11 and the second half-shell 18 is formed by a flange 18*a* equipped with a central barrel 18*b* comprising an axial bore 20 for passage of the output shaft 12.

The two half-shells 17 and 18 are fixed to each other, in the area of their peripheral edges, by connecting parts 21 constituted, for example, by screws.

In the barrel 17*b* of the first half-shell 17 is mounted a first bearing part 23 and this barrel 17*b* is equipped with a gasket 24 which is applied on an extension 14*b* of the damping device 14*a*. Similarly, the barrel 18*b* is equipped with a gasket 25 which is applied on the output shaft 12. A gasket 11*a* is mounted on the input shaft 11 in the area of the extension 14*b* of the damping device 14*a* and a gasket 16*a* is interposed between the two half-shells 17 and 18. Thus, the two half-shells 17 and 18 define a sealed housing 22 containing the clutch 30.

The input shaft 11 is integral in rotation with the plate 32 which is itself integral in rotation with a part 36 fixed in translation carried by a sleeve 38 concentric with the barrel 18*b* of the second half-shell 18. To this effect, the plate 32 is linked in rotation to a ring 36*a* via complementary axial teeth 32*a* mutually engaged and formed respectively on a peripheral portion of the plate 32 and on a peripheral portion of the ring 36*a,* and this ring 36*a* is linked in rotation with the part 36 by a welded line 36*b*.

The clutch 30 comprises a first series of discs 31 carried by the part 36 integral in rotation with the input shaft 11 and a second series of discs 33 disposed between the discs 31 and carried by a plate 34 integral in rotation with the output shaft 12 via flutes 34*a*.

The discs 31 and 33 are movable in axial translation along the flutes provided on the plate 34 and on the part 36 and they are returned toward each other under the action of a mechanical maintaining part 35 also placed in the housing 22. This mechanical member 35 is formed by at least one elastic element interposed between the part 36 and a piston 37 in the form of a disc and mounted slidable on said sleeve 38. As shown on the FIGURE, the piston 37 is supported, at its upper portion, on the first series of discs 31 of the clutch 30. The elastic element 35 is formed, for example, by at least one helical spring and at least one elastic washer or diaphragm.

Preferably, the elastic element 35 is constituted by an elastic washer of the "Belleville" type which has the advantage of generating a high force with a small displacement for a reduced axial size. Finally, this type of washer has a good curve of force as a function of its displacement, and a long life.

Thus, the piston 37 maintains the discs 31 and 33 of the clutch 30 pressed tight against each other under the action of the elastic element 35 which is supported on the part 36. As a result, the clutch 30 is a clutch of the naturally closed type, i.e., it is maintained in engaged position by the elastic element 35. The elastic element 35 is blocked in rotation by the part 36.

The plates 32 and 34 are maintained in positions away from each other and between the flange 17*a* of the first half-shell 17 and the end of the sleeve 38 by stop parts 39.

The transmission module 10 comprises also a hydraulic control circuit for controlling the movement of the piston 37 against the maintaining force of the elastic element 35 to bring the clutch 30 into unclutched position, i.e., in which the discs 31 and 33 are no longer applied against each other.

This hydraulic control circuit comprises a longitudinal channel 40 provided in the barrel 18*b* of the second half-shell 18 and which comprises an input 40*a* connected to a supply of pressurized fluid, not shown, and an output 40*b* opening into a chamber 41. This chamber 41 is defined by a lower portion of the piston 37 and a disc 42 fixed in translation carried by the sleeve 38 and disposed on the other side of said piston 37 with respect to the part 36.

The clutch 30 is a clutch of the wet type and for this reason, the transmission module 10 comprises also a hydraulic lubrication and cooling circuit which comprises a longitudinal channel 50 provided in the barrel 18*b* of the second half-shell 18 and extending parallel to the longitudinal channel 40.

The longitudinal channel 50 comprises an input 50*a* connected to a supply of pressurized fluid, not shown, and an output 50*b* opening into the space 51 between the piston 37 and the plate 34 integral with the output shaft 12.

Further, the longitudinal channel 50 communicates via a transverse bore 52 provided in the output shaft 12 with an axial passage 53 provided in said output shaft 12. This axial passage 53 opens at the free end of the output shaft 12 and, as a result, communicates, on the one hand, with a space 54 formed between the two plates 32 and 34, and on the other hand, with an axial passage 55 provided in the input shaft 11 via a nozzle 53*a* making it possible to adjust the fluid flow rate. The axial passage 55 communicates, via a transverse bore 56 provided in the input shaft 11, with a space 57 formed between the two half-shells 17 and 18, the part 36, and the plate 32 integral with the input shaft 11.

The transmission module 10 operates in the following manner.

The elastic element 35 ensures that the piston 37 is pressed against the discs 31 and 33 of the clutch 30, thus maintaining this clutch 30 normally closed in its natural position, i.e., in engaged position.

When the pressurized fluid reaches the chamber 41 by passing through the longitudinal channel 40, this hydraulic pressure acts directly on the piston 37, triggering, as a result, a force contrary to the elastic element 35. The combination of the hydraulic pressure force and of the elastic element 35 gives the desired force on the piston 37 and on the discs 31 and 33 of the clutch 30.

In the engaged position of the clutch 30, the group of the parts constituted by the input shaft 11, the plate 32, the discs 31 and 33, the plate 34, the piston 37, the elastic element 35, the part 36, and the output shaft 12 rotate about the longitudinal axis formed by the shafts 11 and 12.

The pressurized lubrication and cooling fluid is injected into the space 51 by passing through the longitudinal channel 50, into the space 54 by passing through this same channel 50, then through the transverse bore 52 and the axial passage 53, and finally into the space 57 by passing through these channels 50, 52, and 52, then by the axial passage 55 and the transverse bore 56. Thus, the clutch 30 is cooled, which enables an operation of the discs 31 and 33 of this clutch 30 in a heat transfer fluid to dissipate the energy during the sliding phases. This fluid ensures also the lubrication of the bearing 23 and stop 39 members.

During operation of the transmission module 10, a centrifugation of the lubrication and cooling fluid is created in the spaces 51 and 54, making it possible to maintain the clutch 30 in a bath of lubrication and cooling fluid. The interest of this disposition is to adapt the amount of fluid present in the area of this clutch, in particular to the calorific energy generated by said clutch.

The lubrication and cooling fluid is evacuated by passages 60 and 61 provided in the area of the teeth 32*a* and of the radial wall of the part 36, respectively, so that it can be renewed. The passage 61 is a calibrated passage. The stop 39 located between the plate 32 and the flange 17*a* of the first half-shell 17 is lubricated by the fluid circulating in the longitudinal channel 50, the transverse bore 52, the axial passages 53 and 55, the transverse passage 56, and finally through the bearing 23.

In operation, the discs of the clutch are maintained in a ring of fluid formed by centrifugation, leveled internally by the passage 61, and renewed by the calibrated losses through the passage 60. Maintaining the clutch in this bath of fluid makes it possible to ensure in an optimal manner the cooling and the lubrication of the discs of this clutch.

The transmission module according to the invention makes it possible to minimize the energy consumption used for control of the clutch, since, over the life of a motor vehicle, the clutch is more often in closed position than in open or sliding position. Indeed, in normally closed position, no pressure by the fluid, and thus, no energy, is required to maintain the clutch in this position.

In the transmission module according to the invention, maintaining the clutch in engaged position is obtained by the elastic element which acts directly on the piston of said clutch and controlling this clutch into unclutched position is obtained by the pressure of the fluid that also acts directly on this piston.

The application of pressure, and thus, the consumption of energy to actuate the piston of the clutch, is performed only for the sliding and/or opening of this clutch. The global consumption of energy is thus reduced. The transmission module according to the invention makes it also possible to dimension the source of hydraulic pressure to the minimum in terms of power and service hardship. It also makes it possible to have a good control of the opening and/or closing of the clutch, because of the bijection of the law force/movement of the control piston of the clutch.

Finally, the arrangement of the transmission module according to the invention avoids incorporating a compensation chamber into the casing to compensate for the pressure of fluid in the control chamber of the piston when this chamber is driven in rotation, thus making it possible to reduce the axial size of this module.

The invention claimed is:

1. Transmission module for an engine-transmission unit, in particular for motor vehicles, comprising:

a movement input shaft intended to be connected to a thermal engine, a movement output shaft intended to be connected to a gear box, a connecting clutch between the two shafts, an autonomous casing comprising:

a first half-shell supporting the input shaft movable in rotation, and a second half-shell supporting the output shaft movable in rotation and coaxial to said input shaft, wherein the two half-shells form a sealed housing containing (i) the clutch in a naturally engaged position, (ii) a mechanical member for maintaining the clutch in this engaged position via a piston in the shape of a disc, (iii) a hydraulic control circuit for controlling this clutch in unclutched position by acting directly on said piston against said mechanical member, wherein the hydraulic control circuit comprises a control supply line and a control chamber, and (iv) a hydraulic circuit for lubrication and cooling of said clutch, wherein the hydraulic lubrication circuit comprises a lubrication supply line and a lubrication chamber, wherein the control supply line and the control chamber are separate from the lubrication circuit, wherein the clutch comprises:

a first plate integral with the input shaft, said first plate carrying a first series of discs, and a second plate integral with the output shaft, said second plate carrying a second series of discs disposed between the discs of the first series, said discs being movable in axial translation with respect to one another and returned toward each other under the action of the mechanical member for maintaining the clutch in engaged position, a sleeve concentric with a barrel of the second half-shell, a part fixed in translation with respect to the second half-shell, said part being carried by the sleeve, and a piston mounted slidable with respect to said sleeve and acting on the first series of discs of the clutch, wherein the mechanical member for maintaining the clutch in engaged position comprises at least one elastic element interposed between said part and the piston, wherein the lubrication supply line of the hydraulic lubrication circuit comprises a longitudinal channel provided in a barrel of the second half-shell and comprising an input connected to a supply of pressurized fluid and an output opening into a space formed between the piston and the second plate, and wherein the longitudinal channel is connected, by a through bore, to an axial passage provided in the output shaft and communicating, on the one hand, with a space formed between the first and second plates, and on the other hand, with an axial passage provided in the input shaft and communicating, by a transversal bore, with a space formed between the two half-shells, the part, and the first plate.

2. Module according to claim 1, wherein the first half-shell comprises a central barrel equipped with an axial bore for passage of the input shaft.

3. Module according to claim 1, wherein the barrel of the second half-shell is equipped with an axial bore for passage of the output shaft.

4. Module according to claim 1, wherein the control supply line of the hydraulic control circuit comprises a longitudinal channel provided in a barrel of the second half-shell, said longitudinal channel comprising an input connected to a supply of pressurized fluid and an output opening into the control chamber, and the control chamber is formed by the piston and a disc fixed in translation with respect to the second half-shell, said disc being carried by the sleeve, wherein said disc is located on the other side of said piston with respect to said part, said pressurized fluid applying a force on the piston against the force applied by the elastic element.

5. Module according to claim 1, wherein said elastic element is formed by at least one helical spring or at least one elastic washer or a diaphragm.

6. Engine-transmission unit, in particular for motor vehicles, which comprises a transmission module according to claim 1.

7. Module according to claim 1, wherein the clutch comprises:

a disc fixed in translation with respect to the input shaft, said disc being located between the piston and the second plate, wherein the control chamber extends between said disc and the piston of the mechanical member, so as to apply a force on the piston against the force applied by the elastic element.

8. Module according to claim 7, wherein the lubrication chamber has a ring-shaped peripheral portion, said peripheral portion comprising (i) an inner output orifice at an inner end of said ring-shaped peripheral portion for levelling off lubrication fluid in said ring-shaped peripheral portion internally, and (ii) a second output orifice at a peripheral end of said ring-shaped peripheral portion for renewing lubrication fluid in said ring-shaped peripheral portion by calibrated losses.

* * * * *